(12) United States Patent
Ratner

(10) Patent No.: US 11,226,270 B2
(45) Date of Patent: Jan. 18, 2022

(54) DEVICE AND METHOD FOR COLLECTING LYMPH NODES FROM FATTY TISSUE

(71) Applicant: Oleg Ratner, San Diego, CA (US)

(72) Inventor: Oleg Ratner, San Diego, CA (US)

( * ) Notice: Subject to any disclaimer, the term of this patent is extended or adjusted under 35 U.S.C. 154(b) by 0 days.

(21) Appl. No.: 16/740,016

(22) Filed: Jan. 10, 2020

(65) Prior Publication Data
US 2020/0150006 A1 May 14, 2020

Related U.S. Application Data

(63) Continuation-in-part of application No. 16/221,245, filed on Dec. 14, 2018, now Pat. No. 10,539,485.

(60) Provisional application No. 62/744,029, filed on Oct. 10, 2018.

(51) Int. Cl.
| | | |
|---|---|---|
| G01N 1/00 | (2006.01) | |
| G01N 1/28 | (2006.01) | |
| B01L 3/00 | (2006.01) | |

(52) U.S. Cl.
CPC .............. *G01N 1/286* (2013.01); *B01L 3/508* (2013.01); *G01N 1/28* (2013.01); *B01L 2300/047* (2013.01); *B01L 2300/06* (2013.01); *B01L 2300/0809* (2013.01); *G01N 2001/2873* (2013.01)

(58) Field of Classification Search
None
See application file for complete search history.

(56) References Cited

U.S. PATENT DOCUMENTS

| | | |
|---|---|---|
| 1,952,523 A | 3/1934 | Abbott |
| 2,482,853 A | 9/1949 | Ladd |
| 5,096,676 A | 3/1992 | McPherson et al. |
| 5,127,537 A | 7/1992 | Graham |
| 5,130,105 A | 7/1992 | Carter et al. |
| D340,117 S | 10/1993 | Smalley et al. |
| D349,773 S | 8/1994 | Malin et al. |
| 5,427,742 A | 6/1995 | Holland |
| 5,484,731 A | 1/1996 | Stevens |

(Continued)

FOREIGN PATENT DOCUMENTS

CN 202515365 U 11/2012

OTHER PUBLICATIONS

"Hamstring Harvesting Instrument Case" <https://www.arthrex.com/products/AR-1279C> date unknown.

(Continued)

*Primary Examiner* — Jyoti Nagpaul
(74) *Attorney, Agent, or Firm* — Wagenknecht IP Law Group PC

(57) ABSTRACT

Device for collecting lymph nodes from fatty tissue, which includes a fenestrated sample chamber configured to receive a sample of fatty tissue having lymph nodes; a lockable gate that regulates passage of tissue out of the sample chamber longitudinally; and a pusher that moves longitudinally through the chamber. After treating a sample of resected fatty tissue with a solvent that dissolves fat, the sample is pushed through the fenestrated sample chamber, where the dissolved fat is eluted transversely through the fenestrations. Remaining lymph nodes, arteries, veins, nerves and connective tissue are packed to form a tissue block, which is sized for use with histology cassettes.

4 Claims, 10 Drawing Sheets

(56) References Cited

U.S. PATENT DOCUMENTS

| | | | |
|---|---|---|---|
| 5,678,465 A * | 10/1997 | Krumdieck | B26D 7/28 |
| | | | 83/36 |
| 5,827,217 A | 10/1998 | Silver et al. | |
| D421,498 S | 3/2000 | Livingston | |
| D461,554 S | 8/2002 | Lafond et al. | |
| D694,085 S | 11/2013 | Fukano et al. | |
| D716,627 S | 11/2014 | Lin | |
| D760,053 S | 6/2016 | Schweigert | |
| D775,830 S | 1/2017 | Duvigneau | |
| 10,126,215 B2 | 11/2018 | Stern et al. | |
| 10,539,485 B1 | 1/2020 | Ratner | |
| 2005/0095666 A1 | 5/2005 | Jhavar et al. | |
| 2007/0225665 A1 * | 9/2007 | Perez-Cruet | A61M 1/0056 |
| | | | 604/317 |
| 2009/0293742 A1 | 12/2009 | Murphy et al. | |
| 2016/0032395 A1 | 2/2016 | Davicioni et al. | |
| 2018/0156698 A1 | 6/2018 | Stern et al. | |

OTHER PUBLICATIONS

PCT/US/2019/055460 International Search Report and Written Opinion dated Jan. 30, 2020.

Basten et al. "A Fast, Standardized Method to Investigate Gastrointestinal Lymph Nodes." Pathologe, 2010, 31:218-224.

Dawson et al. "A Review of Current Challenges in Colorectal Cancer Reporting." Archives of Pathology & Laboratory Medicine Online, Jul. 2019, 143:869-882.

Deng et al. "Clinical Significance of Lymph Node Metastasis in Gastric Cancer." World Journal Gastroenterology, Apr. 2014, 20(14)3967-3975.

Destri et al. "Colorectal Cancer and Lymph Nodes: The Obsession with the No. 12." World Journal of Gastroenterology, Feb. 28, 2014, 20(8):1951-1960.

Flynn et al. "Carnoy's Solution Fixation with Compression Significantly Increases the Number of Lymph Nodes Melded from Colorectal Cancer Specimens." Journal of Surgical Oncology, 2019, 119(6):766-770 or pp. 1-5.

Gopal et al. "Tumor Deposits in Rectal Adenocarcinoma after Neoadjuvant Chemoradiation are Associated with Poor Prognosis " Modern Pathology, Sep. 2014, 27(9):1281-1287.

Lavy et al. "A Comparative Study on Two Different Pathological Methods to Retrieve Lymph Nodes Following Gastrectomy." International Journal of Surgery, 2014, 12:725-728.

Lee et al. "Role of Lymph Node Yield and Lymph Node Ratio in Predicting Outcomes in Non-Metastatic Colorectal Dancer." BJS Open, 2019, 3:95-105.

Lykke et al. "Lymph Node Yield and Tumour Subsite are Associated with Survival in Stage I-III Colon Cancer: Results from a National Cohort Study." World Journal of Surgical Oncology, 2019, 17(62):1-8.

Orsenigo et al. "Clinicopathological Factors Influencing Lymph Node Yield in Colorectal Cancer: A Retrospective Study." Gastroenterology Research and Practice, 2019, 2019:1-6.

Resch et al. Lymph Node Staging in Colorectal Cancer: Old Controversies and Recent Advances, World Journal of Gastroenterology, Dec. 14, 2013, 19(46):8515-8526.

Wu et al. "Assessing the Adequacy of Lymph Node Yield for Different Tumor Stage of Colon Cancer by Nodal Staging Scores." Cancer, 2017, 17(498):1-7.

* cited by examiner

DEVICE AND METHOD FOR COLLECTING LYMPH NODES FROM FATTY TISSUE

CROSS REFERENCE TO RELATED APPLICATIONS

This is a continuation in part of U.S. patent application Ser. No. 16/221,245, filed Dec. 14, 2018, now U.S. Pat. No. 10,539,485, which claims priority to U.S. provisional patent application No. 62/744,029, filed Oct. 10, 2018; each of which is herein incorporated by reference in its entirety.

TECHNICAL FIELD

The invention relates generally to the field of medical devices for use in the field of oncology and more specifically to a device for collecting lymph nodes from a resected sample of fatty tissue, which presents the lymph nodes in a densely packed tissue block that can be sectioned for histopathological evaluation and improved staging of cancerous conditions.

BACKGROUND OF THE INVENTION

The metastatic involvement of lymph nodes is a determining factor for staging various cancers. Although evaluation of all resected material for all lymph nodes and all surrounding biological components having useful information would be preferred, it is not feasible using conventional techniques because it would require processing hundreds of histology cassettes and slides, many of which would not include any lymph nodes or useful information. Therefore, current approaches focus on identifying and removing lymph nodes from resected fatty tissue. However, there is disagreement as to how many lymph nodes should be evaluated for effective staging. Clinical quality guidelines suggest the evaluation of at least 12 lymph nodes; however, there is increasing acceptance that evaluation of 12 lymph nodes is insufficient for adequate staging. Studies have found that, particularly in patients at stages I-II colon cancer, there is a direct proportional relationship between the number of lymph nodes evaluated and rate of survival.

There are different variables that affect the retrieval of lymph nodes. Among these include effectiveness of the surgeon, the surgery, and the pathology exam. Ideally, the surgeon should remove all original lymph nodes pertaining to a tumor, and the pathologist should sample and examine them thoroughly. However, retrieving lymph nodes from resected fatty tissue is time consuming and difficult.

Lymph nodes are conventionally retrieved from fatty tissue using manual palpation with the fingers. To this end, larger lymph nodes are more visible and palpable than smaller lymph nodes, and therefore larger lymph nodes tend to be collected at a higher frequency. However, some studies suggest that 45%-60% of metastatic colon cancer lymph nodes have a diameter less than 5 mm, and some metastatic lymph nodes have a diameter less than 1 mm. As should become apparent, manual palpation is not only laborious but is also prone to error. Studies show that manual palpation methods at best achieve about 50% of lymph nodes from a resected fatty tissue sample, which correlates to a false negative error of 10-35%.

Due to both the importance and challenges associated with retrieving lymph nodes sized at only a few millimeters or less, it has been suggested that fat clearance techniques or the intra-arterial injection of methylene blue may improve identification and retrieval methods; however, even in such instances the staff must work through the entire fatty tissue sample manually to obtain the maximum number of identifiable lymph nodes, which is usually limited to those sized about 5 mm or greater. Still, at best, the yield is limited to about 50% or less of all lymph nodes.

Accordingly, on one hand, there remains a need to improve the yield of lymph nodes collected from fatty tissue for histopathological evaluation, and there remains a need to increase the amount of biologically relevant information for histopathological evaluation. However, on the other hand, there is a need to minimize the number of histology cassettes and slides used to evaluate higher yields of lymph nodes and biologically useful information, and there remains a need to decrease the time and skill level required to achieve these higher yields.

SUMMARY OF THE INVENTION

The invention addresses the above challenges and provides related benefits. In particular, the devices and methods significantly increase the yield of lymph nodes for histopathological evaluation compared to manual palpation methods. The devices and methods can yield 100% of lymph nodes from resected fatty tissue.

From a large sample of resected fatty tissue, the devices and methods form a densely packed tissue block that is substantially free of fat and thus composed essentially of remaining lymph nodes, arteries, veins, nerves and connective tissue. The removal of fat is performed by its dissolution in a solvent, then its elution from a fenestrated sample chamber as remaining lymph nodes, arteries, veins, nerves and connective tissue are pushed distally against a closed gate to form the tissue block. Since the tissue block is formed having width and height dimensions for placement in histology cassettes, the operator simply slices the packed tissue block across its length to form a plurality of sections for histopathological evaluation, which provides useful information regarding the staging of cancer. Due to the high density of remaining lymph nodes, arteries, veins, nerves and/or connective tissue in the tissue block, a thorough evaluation of total embedded material from resected fatty tissue can be performed using a minimal number of histology cassettes/slides.

Accordingly, in one aspect of the invention, a device for collecting lymph nodes is provided, which includes a fenestrated sample chamber configured to receive a sample of fatty tissue having lymph nodes, the fenestrations being through bores positioned or arranged along a longitudinal length of the sample chamber, which are configured to elute liquid and dissolved fat out of the sample chamber; a lockable gate configured to regulate passage of tissue out of the sample chamber by locking the gate in a closed position and unlocking the gate; and a pusher including a block configured to move along the longitudinal axis of the chamber, thereby permitting packed tissue to be pushed out of the sample chamber when the gate is not locked in the closed position. To this end, the pusher is configured to push fatty tissue through the sample chamber and along the longitudinal positioning/arrangement of the through bores, where solvent with dissolved fat is eluted transversely as the tissue moves distally through the sample chamber. When the gate is locked in the closed position remaining tissue is packed to form a tissue block, which can include the lymph nodes, arteries, veins, nerves and/or connective tissue from the fatty tissue. When the gate is subsequently opened, the device is configured to push the packed tissue block out of the chamber. By directing the elution of liquid and dissolved fat transversely along the length of the chamber as the tissue is pushed longitudinally, the device efficiently elutes dissolved fat while packing the remaining lymph nodes, arteries, veins and connective tissue in into a tissue block that is substantially free from fat.

The through bores are sized to permit liquid and dissolved fat to elute from the sample chamber while retaining tissue rich in lymph nodes, vessels, nerves, and connective tissue within the chamber for packing. In some embodiments, the through bores are sized between 0.5 mm and 5 mm in diameter. In some embodiments the through bores are 2 mm, about 2 mm, 2.5 mm, or about 2.5 mm in diameter. In some embodiments, the through bores are spaced longitudinally apart from one another from 0.5 mm to 1.5 cm. In some embodiments, the through bores are spaced longitudinally apart from one another 7 mm, 8 mm, 9 mm, 1 cm, 1.1 cm, 1.2 cm, 1.3 cm or 1.5 cm.

The sample chamber is preferably formed into two regions, namely, a distal region, which is characterized as having a fixed top portion, and a proximal region which is characterized as having a removable top portion. The fixed top portion is positioned distal to the removable top portion. This configuration allows the tissue to be tightly packed distally, while also permitting additional sample to be loaded into the chamber proximally. By separating the top into two portions and thus the sample chamber into two regions, the packing forces can be directed distally underneath the fixed top portion, which permits the proximally positioned, removable top portion to be easily removed and reattached for loading additional sample. Moreover, the positioning of fenestrations along the longitudinal length of the sample chamber permits liquid with dissolve fat to be constantly eluted as the tissue is packed distally. As such, the device permits repeated tissue packing and sample loading steps in a single chamber to form a single tissue block. The resulting tissue block has a volume that is about 10% of the volume of the initial resected fatty tissue sample.

The lockable gate can be an end cap that reversibly caps the distal end of the sample chamber. In other embodiments the lockable gate can be a wall that slides into a slit formed near the distal end of the chamber. Preferably, the lockable gate includes a slide lock configured to lock and unlock the gate by sliding the gate perpendicular to the sample chamber, whether inside or outside of the chamber. When locked, the gate provides a distal surface against which the tissue can be packed. Then, opening the gate permits the packed tissue to be pushed distally out of the sample chamber for further processing, such as slicing into sections for histopathological evaluation.

In some embodiments, the chamber is sized so that the tissue block is formed having dimensions pre-set for histology cassettes, thereby only requiring a single cut of the tissue block across its longitudinal length for mounting the cut section into a cassette. In some embodiments, the sample chamber has internal height and width dimensions of less than 25 mm each and an internal length dimension of more than 20 cm. In some embodiments, the sample chamber has width and height dimensions between 18-23 mm×18-23 mm and a length of 40-80 cm In some embodiments, the pusher includes a block and a threaded rod. In further embodiments a guide is positioned proximal to the sample chamber to longitudinally guide the rod through the sample chamber. In some embodiments, the guide is switchable between two configurations, where a first configuration requires rotation of the rod for longitudinal movement of the block and a second does not.

In some embodiments, the guide has a hinged top to open and close, which switches the guide between two configurations, where a closed configuration engages threads on the top and bottom of the guide against the threaded rod, and where an open position removes the threaded top from engagement with the threaded rod, thereby permitting the rod to be lifted from the lower threads to be pulled or pushed. In such configurations the threaded rod and block forming the pusher can include a ball and socket mating to permit the proximal end of the rod to be lifted while the block remains stationary.

In some embodiments, the guide includes a partially threaded inner surface that reversibly engages the threads of the rod to provide a first configuration for helically rotating the rod and a second configuration of the guide permits longitudinal sliding of the rod and block without requiring the rotation.

In some embodiments, the guide has a removable threaded top that is threaded along its interior, the surface facing the threaded rod, while the interior of the guide along the bottom and sides is smoothed and thus not threaded. In such embodiments, the guide can include complimentary structures that lock and unlock the threaded top for attachment and removal, thereby providing two different configurations, namely, an attached configuration for helical movement of the rod along the threaded top and a removed configuration for longitudinally sliding the rod along the smoothed bottom and optionally inner sides.

The device can also include a base onto which the sample chamber reversibly locks. The guide can upwardly extend from the base and can be attachable to the base or integral with the base.

The device can also include a cutting chamber aligned distal to the sample chamber for receiving packed tissue from the sample chamber and to facilitate cutting of the packed tissue block into sections of a desired a thickness for histopathological evaluation. In some embodiments the cutting chamber has sets of opposing through slots aligned to permit slicing of the packed tissue into sections. In some embodiments, the sample chamber and cutting chamber have complementary structures that reversibly attach to one another, thereby permitting the cutting chamber to reversibly connect to the sample chamber. In other embodiments, the sample chamber and cutting chamber are integral with one another.

The device can also include a moveable support that fits within a pair of opposing through slots to traverse the cutting chamber, can include a knife or blade configured to cut the tissue block across the through slots but having a frame that prevents the cutting blade from scraping against the bottom of the cutting chamber, and can include a spatula.

In a related embodiment, a device for collecting lymph nodes from fatty tissue is provided, which includes a fenestrated sample chamber configured to receive a sample of fatty tissue including lymph nodes, the sample chamber having a gate for opening and closing the sample chamber; a pusher having a block and a threaded rod, the pusher configured to push within the sample chamber to reduce a chamber volume when the sample chamber is closed and configured to push entirely through the sample chamber when the sample chamber is subsequently opened; and a guide positioned outside of the sample chamber that guides the threaded rod, where the guide has a removable threaded top that is threaded complementary to the threaded rod and a smoothed bottom that is not threaded. Mating the threaded top to threads of the threaded rod requires rotational movement of the threaded rod while removing the threaded top permits the threaded rod to slide along the smoothed bottom.

In a related aspect of the invention, a method of collecting lymph nodes from fatty tissue is provided, which includes: pretreating a sample of fatty tissue that includes lymph nodes with a solvent that dissolves fat; pushing the pretreated sample longitudinally through a fenestrated sample chamber and against a locked gate to elute liquid and dissolved fat from the fenestrations, which are embodied as a plurality of through bores positioned along a longitudinal length of the chamber, while packing the lymph nodes and remaining tissue into a tissue block; unlocking the gate; and pushing the packed tissue block from the chamber.

In another related aspect, a method of collecting lymph nodes from fatty tissue is provided, which includes dissolving fat from a sample of resected fatty tissue; eluting the dissolved fat from the sample; packing remaining tissue, which is substantially free of fat, into a tissue block, where the tissue block is packed into dimensions between 18-23 mm in width and in height; and cutting the packed tissue block across its length to form a plurality of tissue sections sized between 18-23 mm in width and in height.

In yet another related aspect, a method of sectioning tissue for histology cassettes is provided, which includes: adding a sample of fatty tissue having lymph nodes into a fenestrated sample chamber having width and height dimensions, each from 18 mm to 23 mm, where the fatty tissue is pretreated with a solvent that dissolves fat and the fenestrations are through bores arranged longitudinally along a length of the sample chamber; pushing the sample through the sample chamber to elute liquid and dissolved fat from the chamber and to form a tissue block containing the lymph nodes and any other arteries, veins, nerves and connective tissue; and slicing the tissue block to form individual tissue sections sized for placement in histology cassettes.

In each of the methods, the preferred solvent is Carnoy's solution or 95% ethanol. In each of the methods, the packed tissue block can be cut across its longitudinal extent, such as generally perpendicular to the longitudinal axis, to form a plurality of packed tissue sections sized for placement in histology cassettes. In further embodiments, the packed tissue block is cut into sections using a cutting chamber with opposing through slots configured to accept a knife or blade.

In embodiments, where the sample chamber has a fixed top portion positioned distal to a removable top portion, the method also includes, after pushing the pretreated sample, removing the removable top portion and adding additional sample of treated fatty tissue to the sample chamber; returning the removable top portion to the sample chamber; and pushing the additional sample towards the tissue block to elute additional liquid and dissolved fat from the chamber and to pack additional lymph nodes against the tissue block.

Preferably, the tissue block is sliced to form individual tissue sections sized for placement in histology cassettes. In some embodiments a distal end of the sample chamber has one or more through slots configured to permit slicing of the tissue block into individual sliced sections for placement in individual cassettes. This configuration permits the tissue block to be sliced into individual sections prior to pushing the tissue block from the sample chamber or intermittently while the tissue block is pushed from the sample chamber.

In other embodiments, the tissue block is sliced into individual sections after removal from the sample chamber. This can be accomplished by slicing the tissue block using a suitable knife or blade. Preferably, the tissue block is sectioned for histopathological evaluation using a cutting chamber, which can be aligned distal to the sample chamber for receiving the tissue block from the sample chamber. In other embodiments, the tissue block is sectioned using a wheel spaced distal to the sample chamber to form a cutting space (for cutting the tissue block) and configured for rotation around a longitudinal axis of the sample chamber, where the wheel has receiving ports rotationally aligned to receive the tissue block from the sample chamber in series.

BRIEF DESCRIPTION OF THE DRAWINGS

Embodiments of the invention can be better understood with reference to the following drawings, which form part of the specification and represent preferred embodiments. The features presented in the drawings are not necessarily to scale, emphasis instead being placed upon illustrating the principles of the invention. And, in the drawings, like reference numerals designate corresponding parts throughout the several views.

DETAILED DESCRIPTION OF PREFERRED EMBODIMENTS

Figure 1:
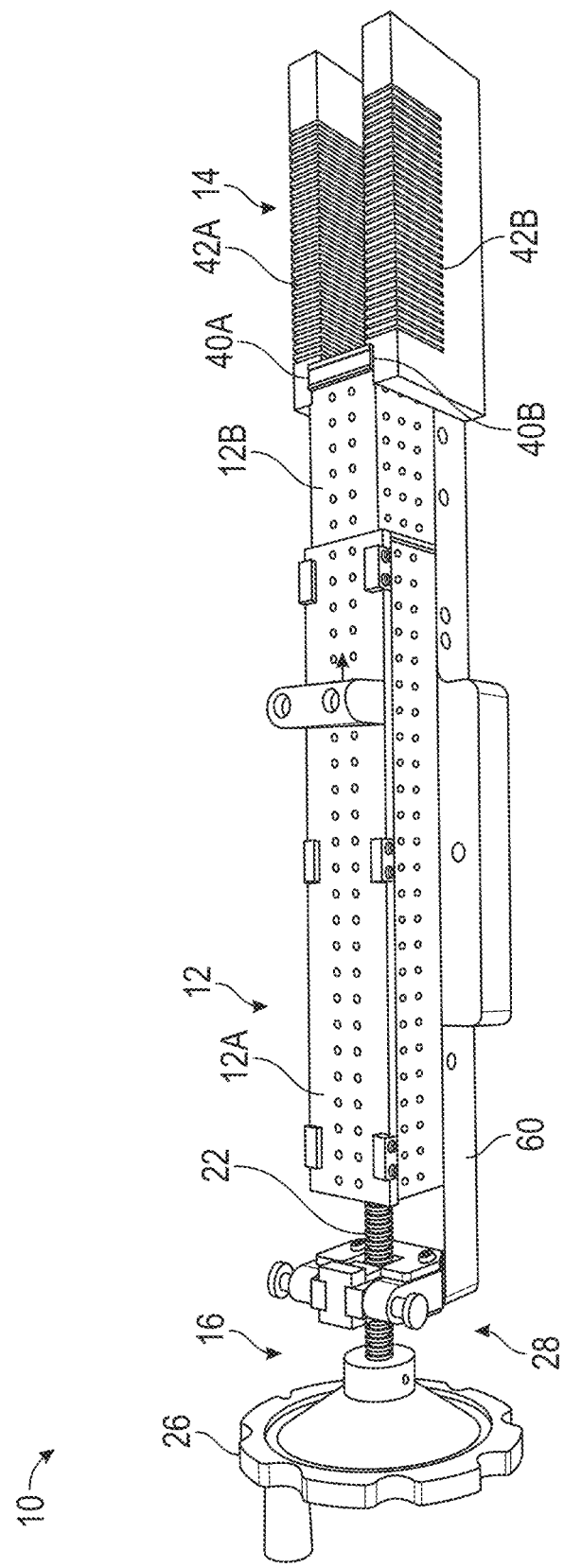
FIG. 1 depicts an exemplary device for collecting lymph nodes from fatty tissue shown in a configuration that also cuts a tissue block into sections for histopathological evaluation.

Among the benefits of the invention include devices and methods that substantially increase the yield of lymph nodes from resected fatty tissue for histopathological evaluation compared to manual palpation methods. Further, the tissue sections obtained using the devices and methods herein include "total embedded material", which in addition to lymph nodes, provide arteries, veins, nerves, and connective tissue, thereby extracting all biologically relevant portions from the resected fatty tissue for cancer staging and evaluation. To this end, the devices and methods reduce the volume of resected fatty tissue for sectioning by about 90% while collecting all lymph nodes and collecting arteries, veins, nerves and connective tissue having biologically useful information. At the same time, the devices and methods do not require the manual palpation of fatty tissue samples.

As will be further described, the invention provides devices and methods, which uniformly and efficiently form and section a tissue block composed primarily of lymph nodes, arteries, veins, nerves, and connective tissue from fatty tissue samples for subsequent histopathological evaluation. It is expected that histopathological evaluation of this "total embedded material", which contains all useful information from resected fatty tissue in regard to cancer staging, will become the new standard. Further, the sectioned samples are pre-sized for use with histology cassettes, thereby avoiding a need for multiple cuts to place packed tissue sections into histology cassettes. As such, the devices and methods permit histological evaluation of all lymph nodes and any arteries, veins, nerves, and connective tissue having useful information from resected tissue. While the device and method are primarily described for clinical use for the staging or treatment of patients, they can also be used in research environments, such as to study the effect of cancer treatment.

As will be described in more detail in the various embodiments, the technical approach of the invention is to provide a longitudinally extending chamber for receiving resected fatty tissue. Through bores are distributed along the longitudinally extending chamber side walls to minimize the distance required for the elution of dissolved fat, which is pressed out of the chamber as the remaining material is pushed distally to form a tissue block rich in lymph nodes, arteries, veins, nerves and connective tissue. The volume of the tissue block is about 10% of the volume of the original resected fatty tissue sample.

The skilled artisan will appreciate that while the devices are depicted primarily with reference to manual use embodiments, the devices and methods can be modified by replacing manual actions with automation, such as by incorporating motors, sensors, automated cutters, sample transfer machinery and suitable software. As such, the invention also encompasses automated components and systems for dissolving fatty tissue, processing remaining tissue into a tissue block(s), and cutting the tissue block(s) into suitable sections for placement in histology cassettes.

For clarity of disclosure, and not by way of limitation, the invention is discussed according to different detailed embodiments; however, the skilled artisan would recognize that features of one embodiment can be combined with other embodiments and is therefore within the intended scope of the invention. Unless defined otherwise, all technical and scientific terms used have the same meaning as is commonly understood by one of ordinary skill in the art to which this invention belongs. If a definition set forth in this document is contrary to or otherwise inconsistent with a well-accepted definition set forth in the art, the definition set forth in this document prevails over a contradictory definition.

The term "complementary structures" as used herein refers to structures having surfaces configured to reversibly mate with one another to reversible lock components together. Examples of complementary structures include pin and aperture, clasps, tongue and groove, hook and loop and others. In embodiments having a cutting chamber, preferably the sample chamber and cutting chamber have complementary structures that permit connection and disconnection. Likewise, the sample chamber and gate preferably have complementary structures to permit the gate to open and lock closed.

The term "distal" or "distal end" as used herein refers to the region or end of the device farthest away from the handle. The tissue block exits the distal end of the sample chamber.

The term "entirely traverses the sample chamber" as used herein refers to the ability of the pusher's block to reach the distal-most end of the sample chamber. Preferably, the pusher's block is capable of extending beyond the distal end of the sample chamber when the gate is open to further ensure passage of the entire tissue block out of the sample chamber, such as onto a cutting surface, into a cutting chamber, or into a series of one or more receiving ports of a wheel.

The term "histological evaluation" or "histopathological evaluation" as used herein refers to evaluation of the microscopic structure of tissue in connection with disease, such as for staging of cancer. It is conventionally performed by mounting tissue on slides, which are then viewed optically.

The term "locked" as used herein refers to the ability of the gate to remain in its closed position while packing tissue longitudinally against the gate to form a tissue block.

The term "longitudinally arranged", "longitudinal arrangement", "longitudinally positioned" and a "longitudinal length" as used herein refers to the irregular or regular positioning of through bores along a length of the sample chamber in relation to its longitudinal axis so that as the pusher moves distally along the longitudinal axis to form the tissue block, the through bores continually permit liquid and dissolved fat to flow transverse to the moving direction of the tissue.

The term "opened" as used herein refers to removal of the gate from its closed position. An "opened" gate permits passage of the tissue block out of the sample chamber, such as into a cutting chamber or receiving port.

The term "packed tissue" or "packing tissue" as used herein refers to the formation of a tissue block by reducing the volume between lymph nodes and other biologically relevant components, such as arteries, veins, nerves and connective tissue. Tissue is packed by eluting liquid and dissolved fat from the sample of fatty tissue while the pusher pushes longitudinally through the sample chamber to form the tissue block.

The term "proximal" "proximate" or "proximal end" as used herein refers the beginning region or beginning end of the device or component in relation to the direction tissue is passed through the device. For example, a proximal end of the cutting chamber connects to a distal end of the sample chamber.

The term "receiving ports are rotationally aligned" as used herein refers to the alignment of one port after another such that over a 360-degree rotation of a wheel, each port has been aligned to receive packed tissue from the sample chamber.

The term "sample of fatty tissue" as used herein refers to a portion of fatty tissue that is resected from a patient and added to the device. The "sample of fatty tissue" includes at least some dissolved fat that once formed part of the fatty tissue. Lymph nodes, arteries, veins, nerves, and connective tissue are also typically found in the sample of fatty tissue The term "substantially free of fat" as used herein refers to the absence of fat or a significant decrease in the abundance of fat. While resected fatty tissue tends to be about 90% fat by volume, tissue blocks generated herein are less than 10% fat by volume and can be 1% or less fat by volume.

The term "through slots" as used herein refers to a series of slots that permit the tissue block to be sliced into individual and distinct sections. Through slots can extend across the sample chamber and can be recessed into the bottom of the sample chamber so that they extend below the bottom of the tissue block (which rests on a resting surface). The term "sets of opposing through slots" as used herein refers to sets of two slots that are aligned on opposing sidewalls such that each set of two slots can be linearly traversed, such as to permit passage of a cutting knife or blade across the set of two slots. Opposing through slots preferably extend perpendicular to the direction that the packed tissue longitudinally extends.

The term "tissue block" or "block of tissue" as used herein refers to a collection of lymph nodes and any other arteries, veins, nerves and connective tissue formed into a unit that is substantially free of fat. Preferably, the tissue block or block of tissue is formed to correspond roughly as a rectangular prism of tissue so that it can be sliced along its depth to form sections sized for histology cassettes.

The term "totally embedded material" or "total embedded material" as used herein refers to the biological components or material that remain after fat is dissolved from fatty tissue and eluted. Such biological components include lymph nodes, vessels, nerves, and/or connective tissue. Using the devices and methods, total embedded material is packed into a substantially smaller tissue volume, sectioned, placed in cassettes for further tissue processing, then placed onto slides for histopathological evaluation and thus staging of cancer. It is expected that histopathological evaluation of total embedded material will become the new standard, replacing the clinical guidelines of only evaluating at least 12 lymph nodes for staging of cancer.

Reference will now be made in detail to non-limiting embodiments of the present invention by way of reference to the accompanying drawings, where like reference numerals refer to like parts, components, and structures.

Figure 12:
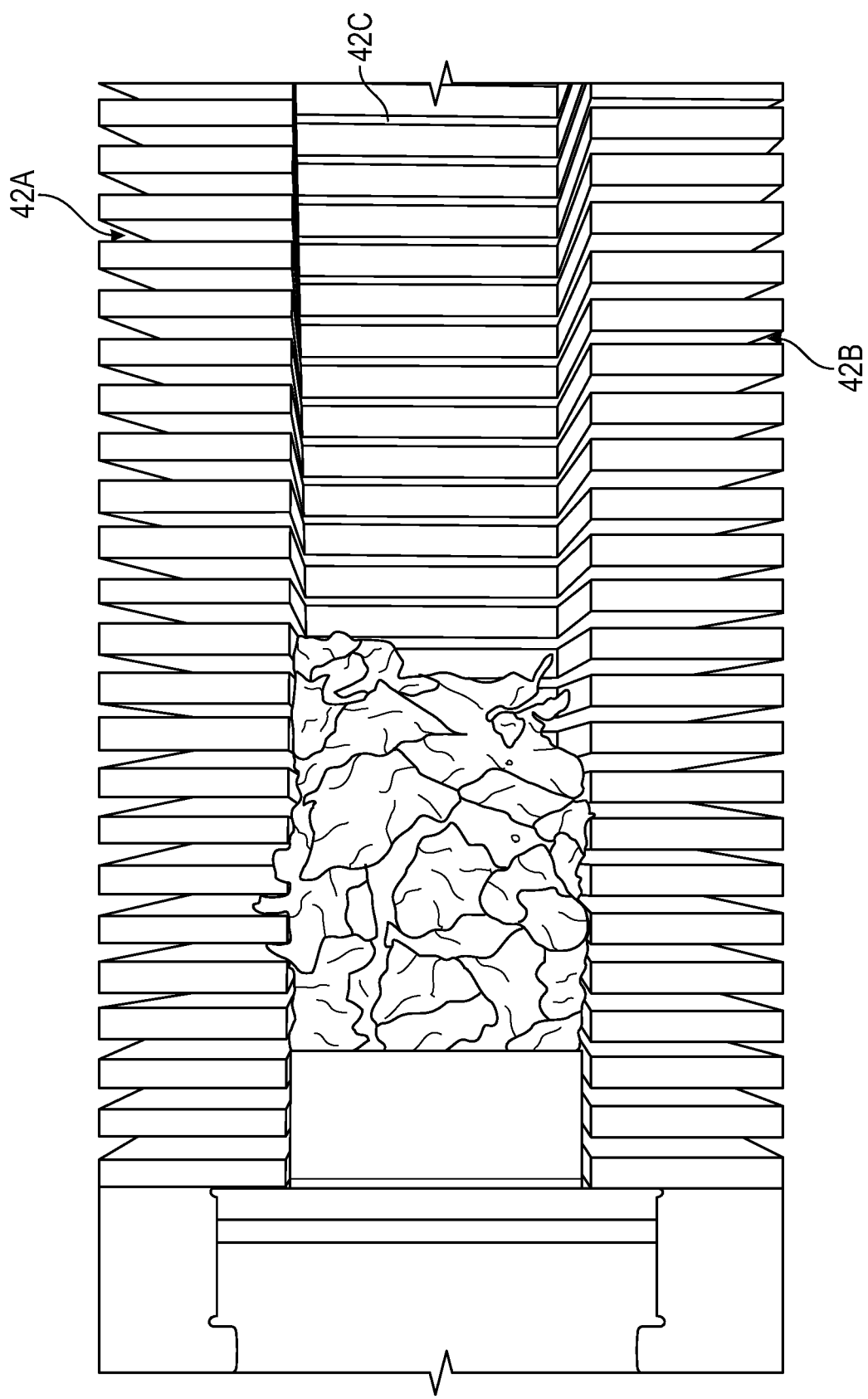
FIG. 12 is a photograph of a packed tissue block being pushed into a cutting chamber.
Figure 13:
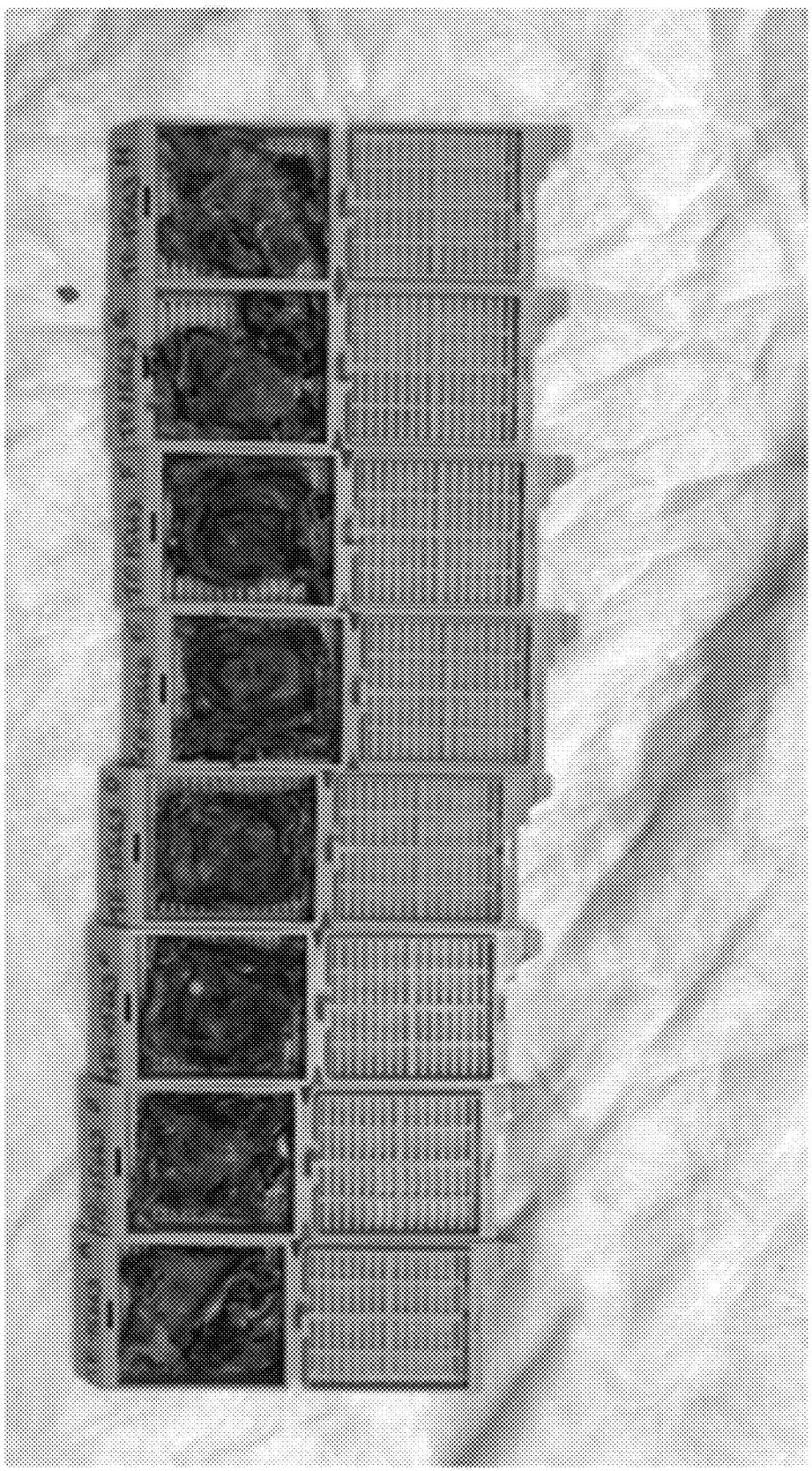
FIG. 13 is a photograph of individual sections cut from a tissue block and placed in histology cassettes.

As an introduction, FIGS. 1-9 depict an exemplary device 10 for collecting lymph nodes from fatty tissue. The device 10 includes a fenestrated sample chamber 12, a pusher 16, and a lockable gate 18. Expanding on the introduction to the device 10 and method depicted in FIGS. 1-9, a sample of resected fatty tissue having lymph nodes is pretreated with a solvent that dissolves fat and loaded into the sample chamber 12, where tissue is packed against a closed gate 18 using the pusher 16. Pushing the tissue against the gate 18, causes dissolved fat and other fluids to elute outward from the sample chamber 12 or device 10 via through bores 20 (also referred to as fenestrations). The tissue remaining in the chamber 12 is packed into a unit referred to herein as a "tissue block" or "block of tissue" (a photograph of a tissue block is depicted in FIG. 12). This tissue block is substantially free from fat, which significantly reduces the volume of sample for subsequent evaluation. Further, the tissue forming the tissue block is referred to as "total embedded material" due to the presence of lymph nodes and other histological components, such as arteries, veins, nerves, and/or connective tissue that do not elute out of the chamber 12. Though nonlimiting, this packed tissue is typically about 10% of the initial volume of fatty tissue added to the chamber 12. The gate 18 is opened and the tissue block, is pushed out of the sample chamber 12. In preferred embodiments, the tissue block is cut into sections for placement in histology cassettes (a photograph of individual sections placed in histology cassettes is shown in FIG. 13). The sample chamber 12 is preferably dimensioned so that the tissue block is pre-sized for placement in histology cassettes for chemical treatment, then onto slides for histopathological evaluation, such as for staging of cancer, such as during staging, treatment and/or prognosis of cancer.

The device 10 improves staging of various cancers by way of improving the yield of lymph nodes collected from fatty tissue resected from a location of a cancer, and thus the device 10 is suited to process lymph nodes from various locations of the body. The device 10 can process any fatty tissue sample for evaluation of lymph nodes and/or components such as arteries, veins, nerves and/or connective tissue. As non-limiting examples, the sample of fatty tissue can be resected tissue from regions nearby the colon, the stomach, the esophagus, the bladder, the pancreas and other regions where fatty tissue is suspected of having lymph nodes susceptible of metastasis. The fatty tissue can be resected from regions near a tumor. Though nonlimiting, a typical sample of resected fatty tissue from the colon is about 200 or 250 grams.

Fatty tissue is typically received in formalin or a formaldehyde-based fixing solution after resection. In preferred embodiments, the formalin solution is replaced with Carnoy's solution or 95% ethanol, then preferably incubated for about 24 hours to dissolve the fat. Carnoy's solution is a mixture of ethanol, chloroform and glacial acetic acid.

The sample chamber 12 is configured to receive the fatty tissue and therefore the artisan will appreciate that the sample chamber 12 can vary in volume. However, the sample chamber 12 preferably has height and width dimensions so that the tissue block only requires cutting along its thickness or depth for placement in histology cassettes. That is, the width and height of the interior portion of the sample chamber 12 is preferably sized within the dimensions of a conventional histology cassette. In some embodiments, the width and height of the interior of the sample chamber 12 is about 1 or 2 mm smaller than that of the histology cassette used with the device 10. As general guidance the international standard for histology cassettes is about 22 mm by about 23 mm. As such, the preferred dimensions of the inner surface of the sample chamber 12 would have width and height dimensions less than 25 mm, preferably about 20-21 mm by about 21-22 mm, though smaller dimensions could also be used. In some embodiments the length and width dimensions are each between 15 mm and 23 mm. By sizing the sample chamber 12 to conform to histology cassette sizing, further size adjustment of the width and height of the tissue block is not required for loading into histology cassettes. That is, larger sections, while not excluded from the broadest form of the invention, would likely require further cutting. The artisan will appreciate that larger chamber dimensions may be preferred when forming a tissue block for research purposes.

The sample chamber 12 is preferably formed from metal or metal alloy and is preferably configured as having two portions, which primarily differ by the top, namely, a removable top portion 12A and a fixed top portion 12B. The fixed top portion 12B is positioned distal to the removable top portion 12A so that as the tissue block is formed, it abuts the locked gate 18, fenestrated sidewalls and the fenestrated fixed top portion 12B. By providing a removable top portion 12A that separates from a fixed top portion 12B proximally, outward forces exerted by the tissue block can be primarily exerted against the fixed top portion 12B rather than the removable top portion 12A. The operator is therefore able to easily remove and reattach the removable top portion 12A to load additional sample while the fixed top portion 12B remains under pressure from the tissue block. Further, the sample chamber 12 is preferably removably mounted to a base 60 as further support during use.

One of ordinary skill in the art to which the invention belongs would recognize that the length ratio of the removable top portion 12A to the fixed top portion 12B can vary; however, in preferred embodiments the length of the removable top portion 12A is significantly greater than the length of the fixed top portion 12B due to the reduction of sample volume when packing the tissue by pushing the pusher. As general guidance, the device 10 and methods herein result in a tissue block that is about 10% of the volume compared to the originally loaded fatty tissue sample when using Carnoy's solution or 95% ethanol.

Figure 2:
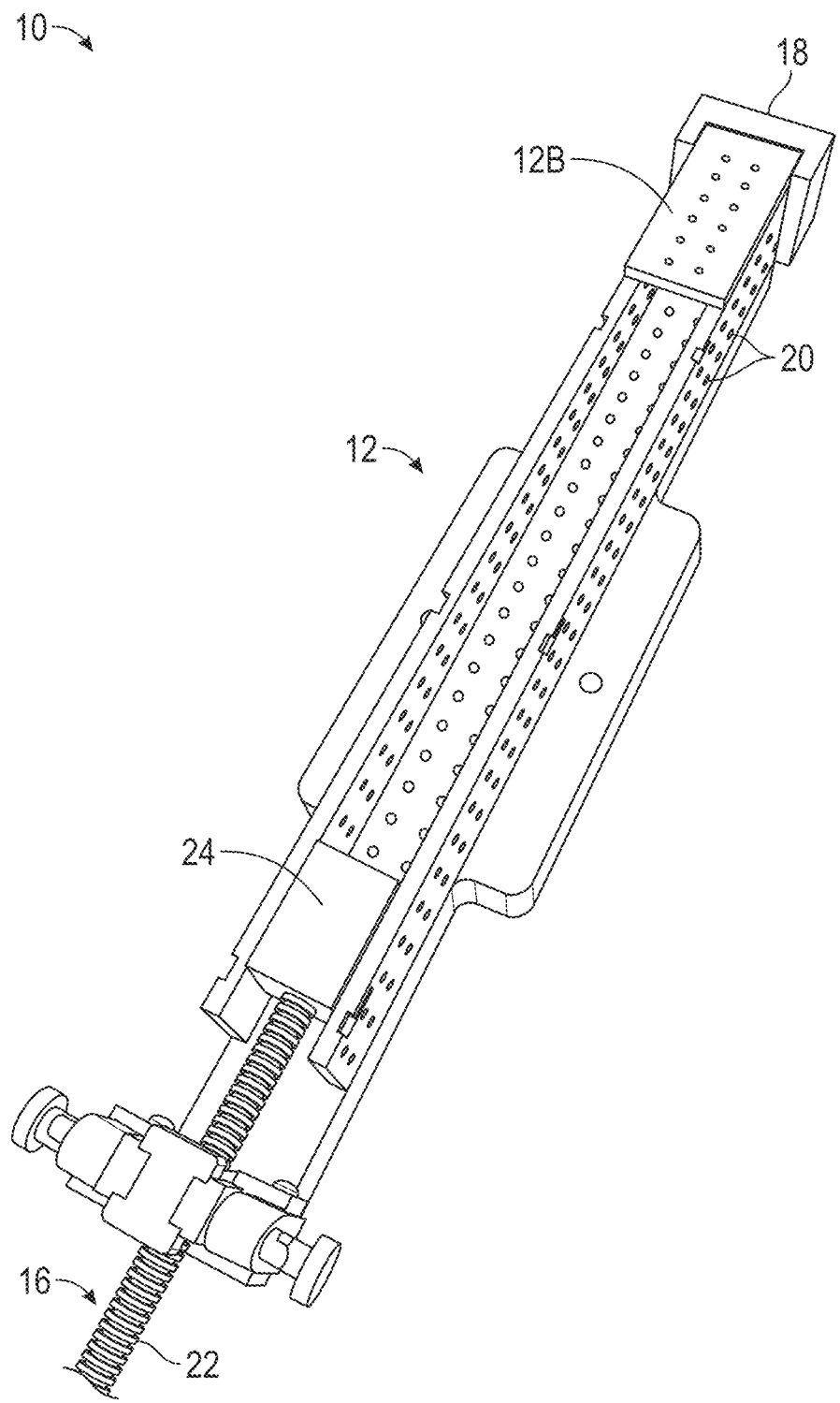
FIG. 2 depicts the device in a loading configuration for loading a sample of fatty tissue.

Turning to FIG. 2, the device 10 is shown in its sample loading configuration, which is characterized as having an open chamber 12 with retracted pusher 16. The fatty tissue is loaded distal to the pusher 16.

Figure 3:
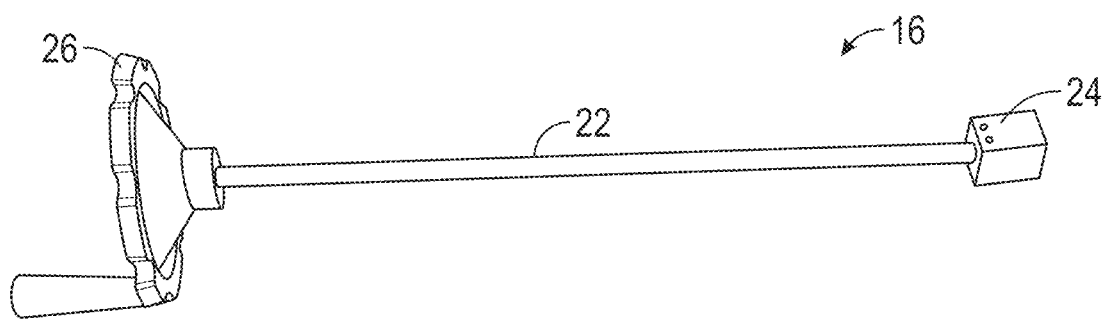
FIG. 3 depicts an exemplary pusher.
Figure 4:
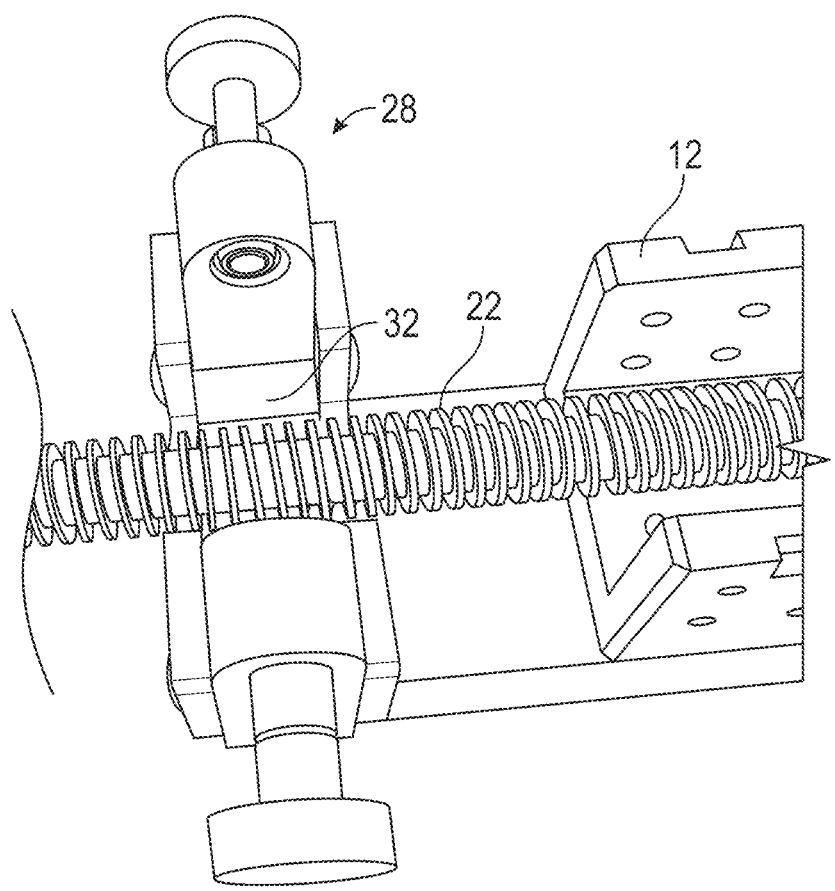
FIG. 4 depicts the guide configured to permit longitudinal sliding of the pusher's threaded rod through the sample chamber.

As shown in FIGS. 3 and 4, the pusher 16 is preferably constructed as an elongated threaded rod 22, having at its distal end a block 24 and at its proximal end an actuator 26. As shown better in FIG. 4, the threaded rod 22 exits the sample chamber 12 proximally and is fed through a guide 28.

Figure 5:
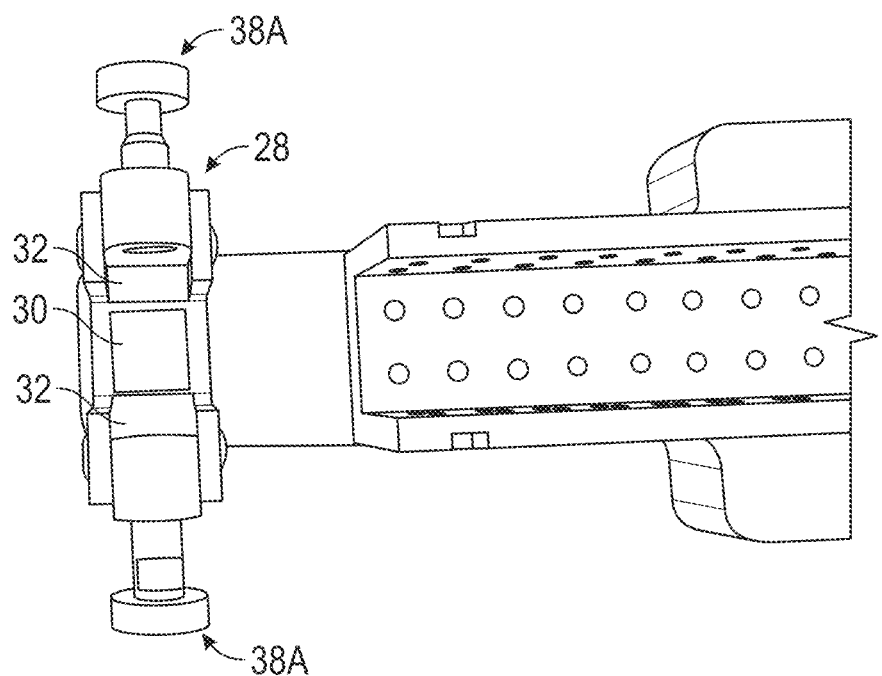
FIG. 5 depicts an exemplary smoothed bottom and inner sides of the guide.
Figure 6A:
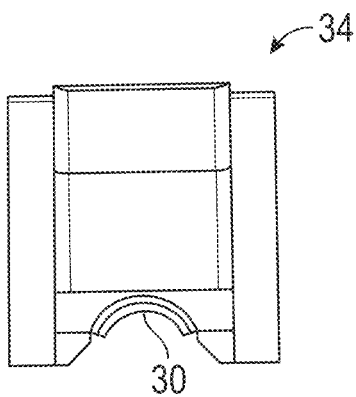
FIGS. 6A-C depict different views of an exemplary threaded top of the guide.
Figure 6B:
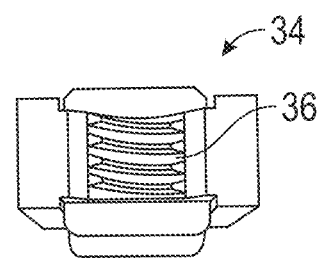
Figure 6C:
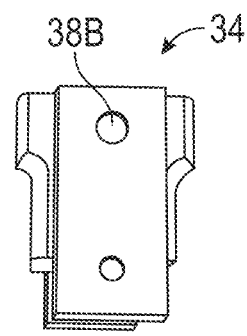

The guide 28 itself has two configurations. FIGS. 4 and 5 show a first configuration, where the guide 28 consists essentially of a smoothed bottom 30 and smoothed lateral sides 32 to permit the threaded rod 22 to slide longitudinally without requiring rotation. This configuration permits the operator to quickly pull the threaded rod 22 proximally after packing tissue, thereby permitting an additional sample of fatty tissue to be quickly loaded into the sample chamber 12. With reference to FIGS. 6A-C and FIG. 7, a second configuration is characterized by the attachment of a threaded top 34 that has threads 36 complementary to the rod 22. When attached, the threaded top 34 engages the threads of the rod 22 for helical rotation. The threaded top 34 is preferably locked into threaded engagement with the rod 22 or unlocked for removal from threaded engagement with the rod 22 by way of complementary locking structures 38A, 38B on the guide 28, such as complementary pull pins and apertures. As shown better in FIG. 8, once engaged, rotation of the actuator 26 turns the threaded rod 22, which moves the block 24 longitudinally. This helical configuration permits additional force to be applied and tends to hold the pusher in place as any counter force is typically applied longitudinally and without rotation. To this end, the first configuration shown in FIG. 4 permits longitudinal sliding of the rod 22; whereas the second configuration shown in FIG. 7 requires rotation of the threaded rod 22 for longitudinal movement. While not shown, in some embodiments, the rod 22 is coupled to a motor for longitudinal movement in both proximal and distal directions.

In some embodiments the threaded top 34 is hinged to a threaded bottom. In such embodiments, the threaded top 34 can be hinged opened and the threaded rod 22 removed from the lower threads, thereby permitting the rod 22 to be pulled or pushed.

Figure 7:
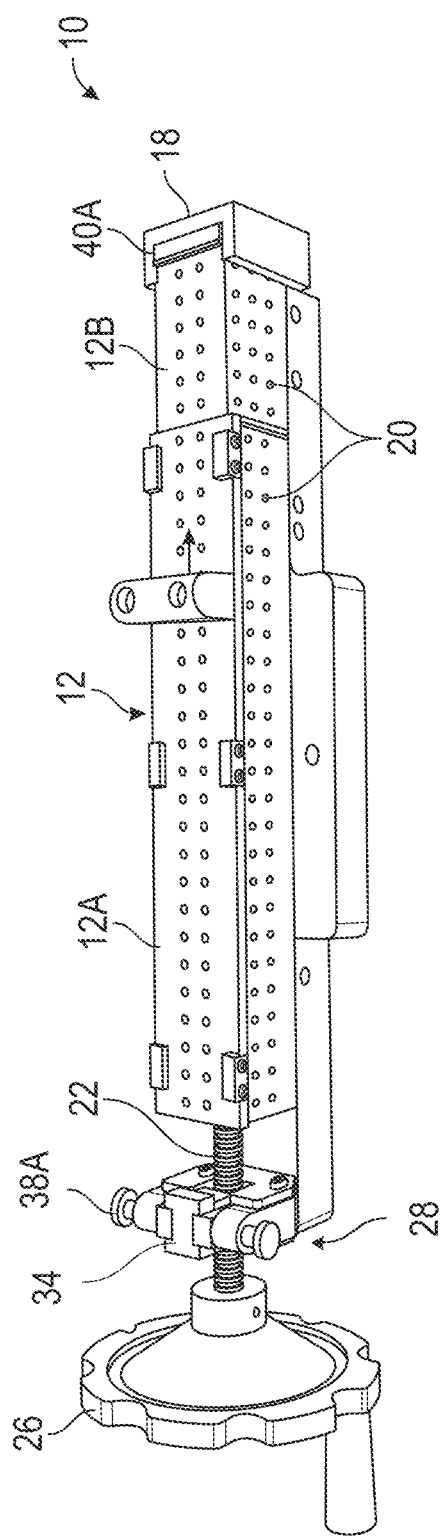
FIG. 7 depicts the device shown in a configuration for forming a tissue block from fatty tissue.
Figure 8:
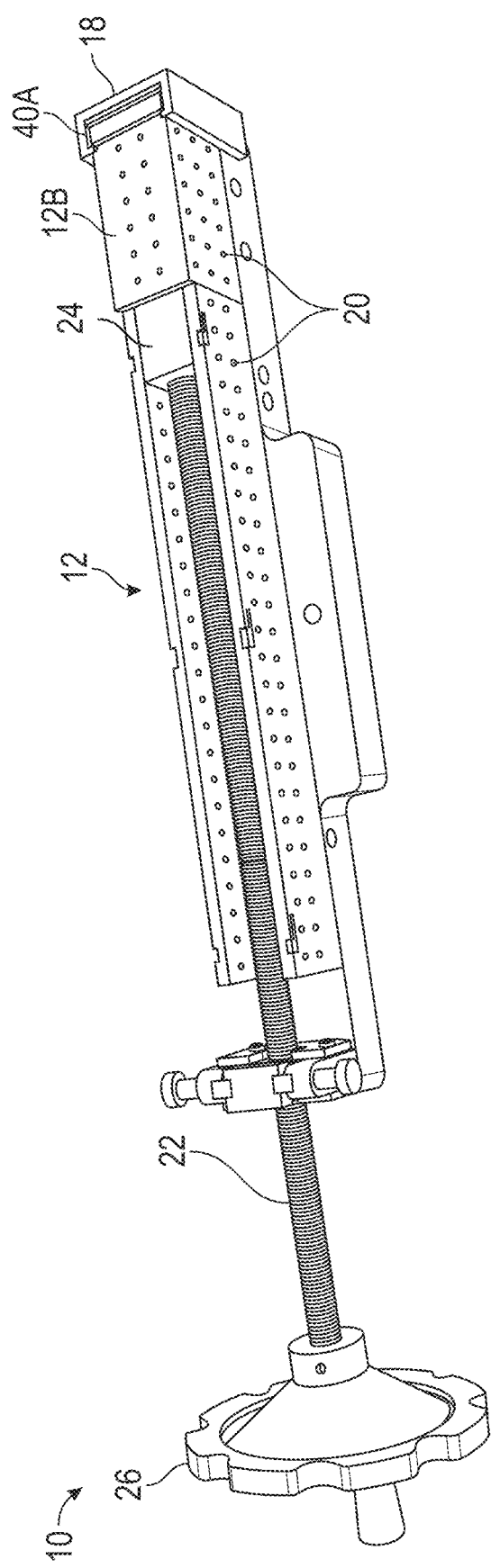
FIG. 8 shows the pusher's block positioned partially underneath the fixed top portion after forming a tissue block. The removable top is removed for adding additional sample after pulling the pusher proximally.
Figure 9:
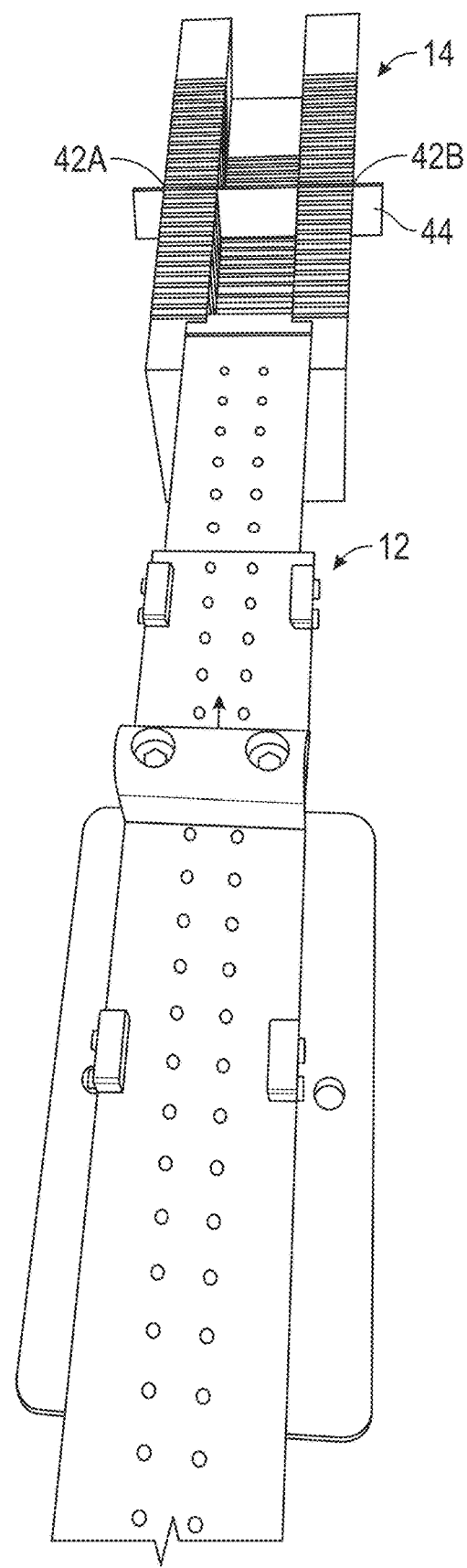
FIG. 9 depicts a barrier extending across a set of opposing through slots of a cutting chamber.

As shown in more detail in FIG. 7 and FIG. 8, at the distal end of the sample chamber 12 is a lockable gate 18, which provides two functions. First, when locked in the closed position as shown in FIG. 7 and FIG. 8, it provides a distal surface limiting distal movement of the tissue block while pushing the pusher 16, thereby permitting the tissue to be packed into a small volume. Second, when unlocked to the open position, such as by removal, the gate 18 permits passage of the tissue block out of the sample chamber 12 for subsequent sectioning. In preferred embodiments, unlocking the gate 18 involves removing the gate 18 from the sample chamber 12. As such, preferably the gate 18 is configured to close a distal portion of the sample chamber 12 for providing a distal barrier for the tissue block during its formation (see FIG. 7), and after forming the tissue block, is configured to unlock or open, thereby permitting passage of tissue block out of the sample chamber 12 for further processing. While the gate 18 can be provided in different forms, a preferred approach is to configure the gate 18 as an end cap, which slides downward and over the sample chamber 12 to its locked position, which terminally blocks the sample chamber 12 and is unlocked by pulling upwards for its removal to open the chamber 12. However, it is also envisioned that the gate 18 could be configured to slide horizontally to open and close.

In embodiments that include a cutting chamber 14, the device 10 can be configured so that the gate 18 slides along a same structure along an outside of the sample chamber 12 as the cutting chamber 14 slides, such as a same set of grooves or ridges along the sample chamber 12.

As yet another example, the sample chamber 12 could have an end slot to permit the gate 18 to slide vertically or horizontally into the sample chamber 12, thereby providing an insertable terminal surface.

Returning to FIG. 7, after adding fatty tissue to the sample chamber 12, the removable top portion 12A is locked into place, the threaded top 34 of the guide 28 is locked into threaded engagement with the rod 22, and the rod 22 is helically moved in the distal direction along the longitudinal axis of the sample chamber 12. As shown more clearly in FIG. 8, longitudinal movement of the rod 22, moves the pusher 16 through the sample chamber 12 longitudinally and along the through bores 20 to push the total embedded material distally to form the tissue block (the removable top is removed for demonstration purposes).

Pushing the pusher distally causes tissue remaining in the sample chamber 12 to pack against the locked gate 18 and underneath the fixed top portion 12B. Meanwhile pushing distally also continues to expel or elute dissolved fat, fixatives and any other solvents present in the fatty tissue sample from the through bores 20, which are typically sized 0.5 mm to 5 mm or about 2.5 mm in diameter. As the tissue is packed into a tissue block and as the dissolved fat is eluted, the volume of tissue having lymph nodes any other arteries, veins, nerves and connective tissue is reduced by about 90%. Thus, after forming the tissue block, this remaining 10% or so of tissue volume consists essentially of total embedded material and is substantially free of fat. This total embedded material is characterized by a substantial increase in density of lymph nodes and other biological components with useful information, such as arteries, veins, nerves and connective tissue, thereby permitting histopathological evaluation of all lymph nodes and any other arteries, veins, nerves and connective tissue using comparatively few slides. Further, it is believed that the overall yield is consistently 100% of all lymph nodes loaded into the sample chamber 12.

Central to the technical approach of the invention is to elute liquid and dissolved fat along the longitudinal length of the sample chamber 12. By "along the longitudinal length of the sample chamber" it is meant that the longitudinally extending side wall(s), longitudinally extending top wall, and/or longitudinally extending bottom wall is fenestrated, so that liquid and dissolved fat are permitted to elute out of the chamber 12 transverse to the direction that the tissue is pushed. That is, while the gate 18 and/or pusher 16 can be fenestrated, it is not necessary because the fenestrated walls effectively wash-out liquid from the sample chamber 12 as the tissue is being pushed longitudinally through the sample chamber 12.

The need for a chamber 12 fenestrated along its longitudinal length is due to the small size of the chamber's 12 width and height dimensions, relative to its length (the chamber's length following the longitudinal axis). In an exemplary configuration the length and width of the chamber 12 are each less than 25 mm and the length of the chamber is more than 20 cm. In preferred embodiments, the chamber's 12 length is at least 10 times that of its width or height. To this end, the surface area of the gate 18 is very small compared to the volume of the chamber 12. Moreover, since the chamber 12 can be refilled with additional sample after packing, the chamber 12 is configured to receive many times its volume. As such, fenestrations at the gate 18 would quickly clog when evaluating a typical volume of resected fatty tissue. However, by adding through bores 20 along the longitudinal length of the chamber 12, such as along one, two, three, or four longitudinally extending walls, substantially more through bores 20 can be added. Moreover, by positioning the through bores 20 along the longitudinal length of the sample chamber 12, the migration distance to reach the nearest through bore 20 can be reduced. Shortening the path to the nearest through bore 20 increases the rate of elution. This becomes increasing important as the tissue becomes more packed and remaining liquid and dissolved fat become more viscous.

The through bores 20 can vary between 0.5 mm and 5 mm in diameter; however, the preferred diameter is from 2 mm to 2.5 mm. It is also preferred to space the through bores 20 from 0.5 mm to 1.5 cm apart from one another. In preferred embodiments, the through bores 20 are spaced 1 cm apart from one another.

After forming the tissue block, the gate 18 is unlocked to permit the pusher 16 to push the tissue block out of the sample chamber 12 for sectioning. Turning back to FIG. 1, in some embodiments a cutting chamber 14 is configured for attachment to the sample chamber 12 by way of complementary engaging structures 40A, 40B, such as tongue and groove, clips, snaps, interference fit or others. In such embodiments, most preferably, both the gate 18 (FIG. 7) and the cutting chamber 14 (FIG. 1) attach to the sample chamber 12 at a same complementary structure 40A on the sample chamber 12 itself. Thus, the gate 18 can be removed and the cutting chamber 14 attached. In other embodiments, the cutting chamber 14 and sample chamber 12 are permanently fixed to one another. In either configuration, the tissue block is pushed into the cutting chamber 14 using the pusher 16. Preferably, the pusher 16 has a sufficient length that the block 24 enters the cutting chamber 14 to at least the first set of opposing through slots 42A, 42B, which assists with complete sectioning of the packed tissue (see FIGS. 12 and 13).

Once pushed into the cutting chamber 14, or periodically while being pushed into the cutting chamber 14, the tissue block is preferably cut or sliced into uniformly thick sections. Uniform cutting is can be arranged by way of sets of opposing through slots 42A, 42B equally spaced and positioned along opposing sidewalls of the cutting chamber 14 and with joining recesses 42C. Preferably, the cutting chamber 14 has an open top and the through slots 42A, 42B extend from the top to at least below a resting surface for resting the tissue block while cutting to ensure complete cutting of the tissue block into distinct sections. Most preferably, a joining recess 42C is aligned with the opposing through slots 42A, 42B and recessed below the resting surface to provide a cutting track to ensure complete slicing. The sections are preferably cut into uniform sections of 2.5 mm thick, which is sized for insertion into histology cassettes. As shown more clearly in FIG. 9, to further ensure uniformity across all sections and/or to improve tissue cutting at the distal end of the tissue block, the device 10 can also include a barrier 44 that can be removably inserted across a set of opposing through slots 42A, 42B (and preferably within the recess 42C). By abutting the barrier 44 against the distal end of the tissue block (when sections are cut from the distal end), further structural support can be provided while cutting, which can improve the quality of tissue sections.

In some embodiments, the device further includes a knife or blade, which is configured to slice the tissue block into sections along the through slots 42A, 42B and recess 42C. In preferred embodiments the blade is configured to extend into the recess 42C, thereby ensuring the tissue block is completely sliced, while having a means for preventing the blade from cutting against the bottom of the cutting chamber 14 itself to prevent dulling of the blade. In some embodiments, the means for preventing the blade from cutting against the bottom of the cutting chamber 14 is a handle or frame that limits the downward displacement of the blade. Such a handle or frame can be sized larger than the through slots 42A, 42B to provide a downward stop.

Removing sectioned tissue from the cutting chamber 14 can be by continued displacement of the pusher's block 24 distally or can be by way of lifting the sectioned tissue away from the cutting chamber 14. In a preferred approach, the sectioned tissue is lifted outwards using a thin spatula configured to slide underneath the sectioned tissue (such as along the resting surface). The sectioned tissue can then be placed in histology cassettes for further processing without additional sizing, thereby saving time by the operator.

The artisan will appreciate that the invention described may be embodied in other specific forms without departing from the spirit or essential characteristics thereof. The specific embodiments previously described are therefore to be considered as illustrative of, and not limiting, the scope of the invention.

In another variation of the above, a device for collecting lymph nodes from fatty tissue is provided, which includes a fenestrated sample chamber 12 configured to receive a sample of fatty tissue having lymph nodes, the sample chamber 12 including a gate 18 for opening and closing the sample chamber 12; a pusher 16 having a block and a threaded rod 22 configured to push within the sample chamber 12 to reduce a chamber volume when the sample chamber 12 is closed and configured to push entirely through the sample chamber 12 when the sample chamber 12 is subsequently opened; and a guide 28 positioned outside of the sample chamber 12 that guides the threaded rod 22, where the guide 28 has a removable threaded top 34 that is threaded complementary to the threaded rod 22 and a smoothed bottom 30 that is not threaded, where the threaded rod 22 contacts the smooth bottom 30. The device 10 can also include a means for cutting or slicing the packed tissue, such as a knife, blade or saw.

In another variation of the device and methods for collecting lymph nodes from fatty tissue, the distal end of the sample chamber 12 has one or more through slots configured to permit slicing of a tissue block into individual slices. This configuration permits slicing a tissue block into individual sections prior to pushing the tissue block from the sample chamber 12 or intermittently while the tissue block is pushed from the sample chamber 12.

Figure 10:
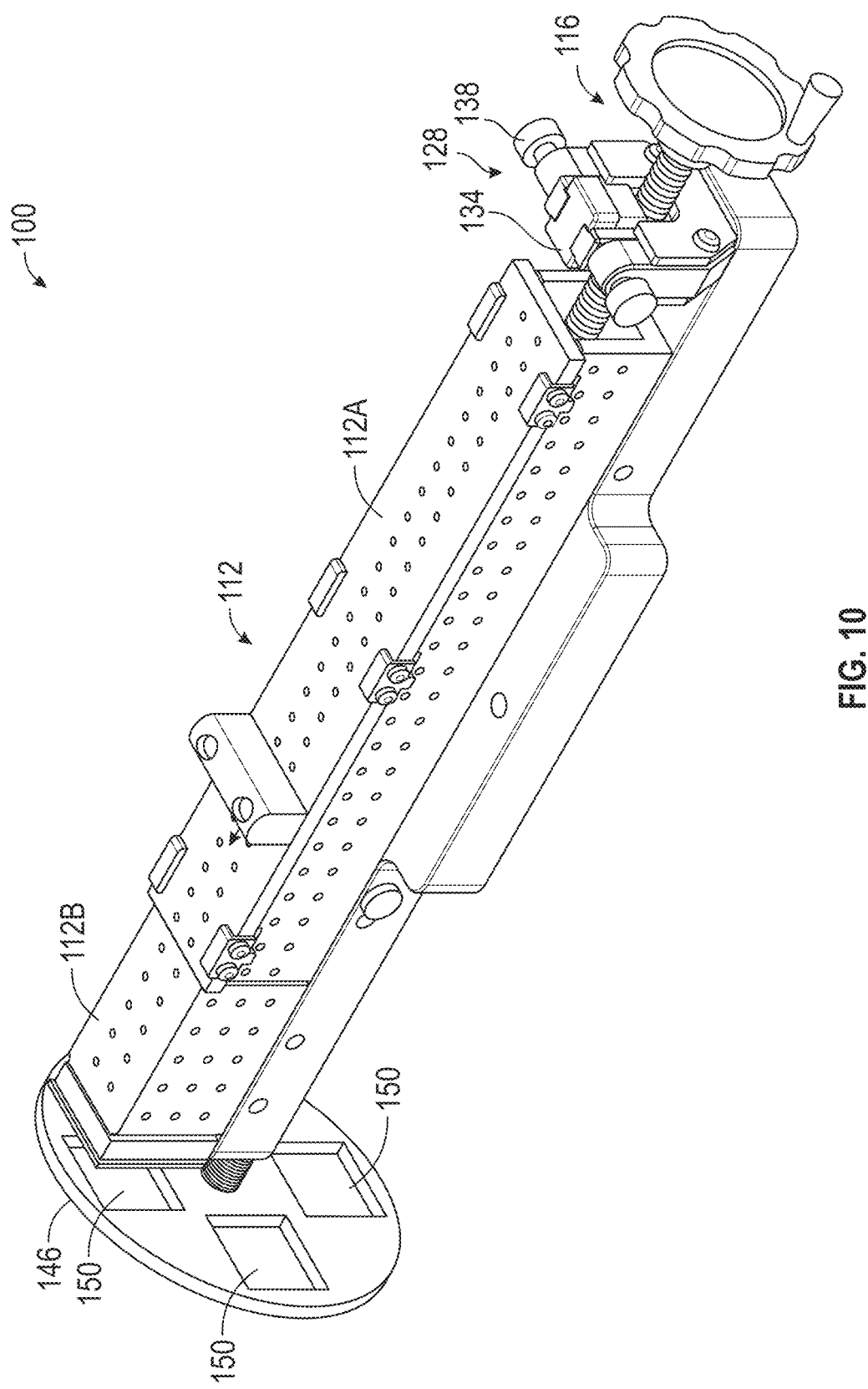
FIG. 10 depicts another exemplary device for collecting lymph nodes from fatty tissue.
Figure 11:
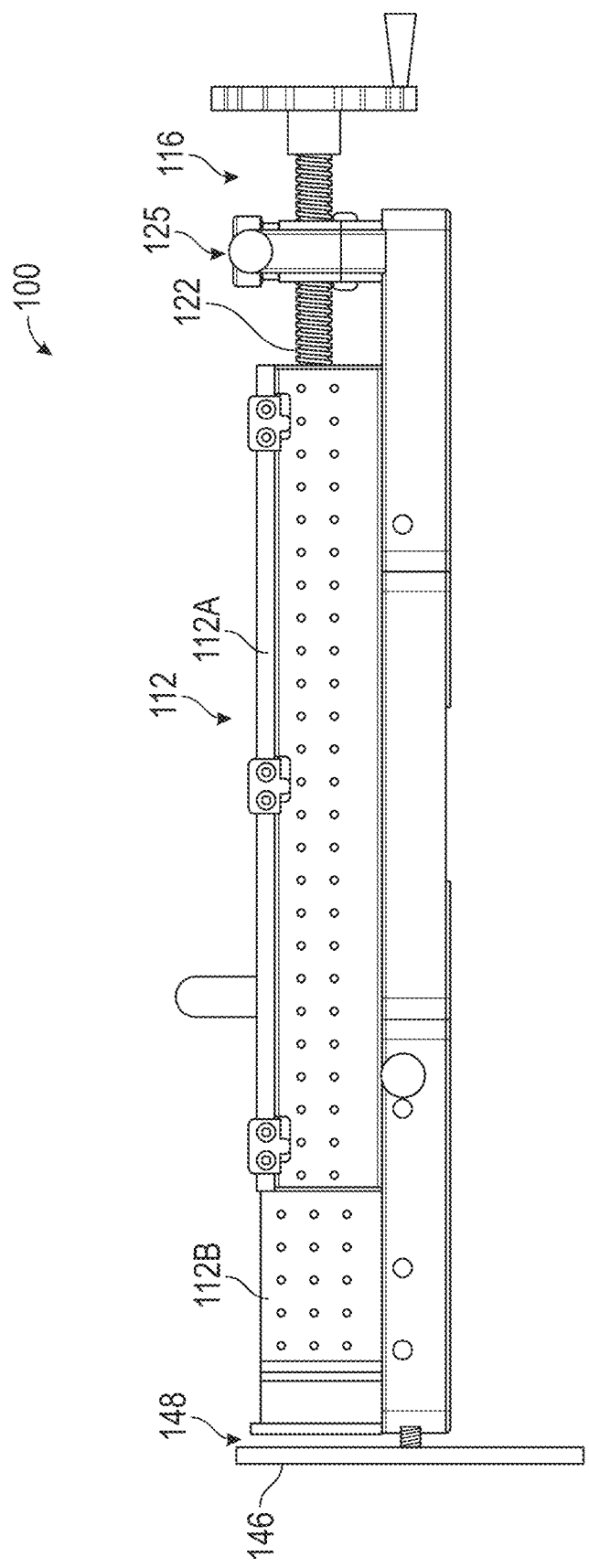
FIG. 11 is a side view of the device shown in FIG. 10.

In still another variation, FIG. 10 and FIG. 11 depict an exemplary device 100 for collecting lymph nodes from fatty tissue. The device 100 includes a fenestrated sample chamber 112 and a pusher 116 configured to move longitudinally through and entirely traverse the sample chamber 112. The device 100 also includes a wheel 146 spaced distal to the sample chamber 112 to form a cutting space 148 and is configured for rotation around a longitudinal axis of the sample chamber 112. The wheel 146 has receiving ports 150 rotationally aligned to receive a tissue block from the sample chamber 112 one after another; and a lockable gate (not shown but the same as gate 18 in FIG. 7) configured to provide a surface against which tissue can be packed to form the tissue block and to regulate passage of the tissue block into the receiving ports 150.

Like the configuration depicted in FIGS. 1-9, the device 100 shown in FIG. 10 and FIG. 11, has a sample chamber 112 with a removable top portion 112A to provide access to the interior of the chamber 112. The preferred mechanism for longitudinal movement of the pusher 116 through the sample chamber 112 and towards the wheel 146 is the same mechanism for longitudinal movement set forth in FIGS. 1-9, namely, the pusher 116 is preferably constructed as an elongated threaded rod 122 exiting the sample chamber 112 proximally and fed through a guide 128. Like the configuration shown in FIGS. 1-9, the preferred guide 128 has a smoothed bottom and lateral sides (not shown) to permit the threaded rod 122 to slide longitudinally when a threaded top 134 that is threaded complementary to the rod 122 is removed. The threaded top 134 is preferably locked into threaded engagement with the rod 122 and unlocked for removal by way of complementary locking structures 138 such as pull pins and apertures.

Use of the device 100 begins substantially as provided previously. Preferably, a sample of fatty tissue is pretreated with a solvent that dissolves fat, more preferably Carnoy's solution or 95% ethanol, but most preferably Carnoy's solution. After adding the sample of fatty tissue to the sample chamber 112, the removable top portion 112A is locked, the threaded top 134 of the guide 128 is locked into threaded engagement with the rod 122, the gate (not shown) is locked in the closed position, and the rod 122 is helically moved distally along the longitudinal axis of the sample chamber 112 to elute dissolved fat and to pack the tissue against the gate, which remains locked in its closed position, thereby forming a tissue block.

Dissolved fat is eluted out of the sample chamber 112 or device 100 via the through bores 120, which are longitudinally arranged along the length of the sample chamber 112. As the tissue block is formed, the volume storing the lymph nodes any other arteries, veins, nerves and connective tissue decreases and thus the density of total embedded material increases. As such, the tissue block is characterized as substantially free of fat and composed primarily of lymph nodes and any other arteries, veins, nerves and connective tissue.

Once the tissue block is formed and the flow of dissolved fat from the through bores 120 stops or slows, the gate is unlocked to its open position. The tissue block is pushed into a receiving port 150 of the wheel 146. The tissue block is then cut into uniformly thick sections by way of cutting proximate to the wheel 146, such as at a cutting space 148. The wheel 146 rotates such that another receiving port 150 is aligned with the sample chamber 112, and the tissue block is further pushed distally into the newly aligned receiving port 150, then again cut. The wheel 146 is again rotated and the process repeated for a next receiving port 150. Tissue sections are then removed from the receiving ports 150 and placed on histology cassettes (see also FIG. 13).

Referring back to FIGS. 7 and 8, in related embodiments, a method of sectioning tissue for histology cassettes is provided, which includes: adding a sample of fatty tissue into a fenestrated sample chamber 12 having width and height dimensions between 15 mm and 23 mm, wherein the fatty tissue is pretreated with a solvent that dissolves fat and the fenestrations are through bores 20 longitudinally positioned along the sample chamber 12; pushing the pusher to elute liquid and dissolved fat from the through bores 20 along the longitudinal length of the chamber 12 to form a tissue block; and slicing the tissue block along its depth to form individual packed tissue sections sized for placement in histology cassettes.

What is claimed is:

1. A method of collecting lymph nodes from fatty tissue, the method comprising:
    pretreating a sample of fatty tissue that includes lymph nodes with a solvent that dissolves fat;
    pushing the pretreated sample longitudinally against a locked gate of a fenestrated sample chamber to elute liquid and dissolved fat from the fenestrations while packing the lymph nodes and remaining tissue into a tissue block, wherein the fenestrations are a plurality of through bores positioned along a longitudinal length of the chamber;
    unlocking the gate; and
    pushing the packed tissue block from the chamber.

2. The method of claim 1, wherein the solvent is Carnoy's solution.

3. The method of claim 1, further comprising cutting the packed tissue block across its longitudinal extent to form a plurality of packed tissue sections sized for placement in histology cassettes.

4. The method of claim 1, wherein the sample chamber comprises a fixed top portion positioned distal to a removable top portion, wherein between the steps of pushing the pretreated sample and unlocking the gate, the method further comprises performing the following series of steps one or more times:
    removing the removable top portion and adding additional sample of treated fatty tissue to the sample chamber;
    returning the removable top portion to the sample chamber; and
    pushing the additional sample towards the tissue block to elute additional liquid and dissolved fat from the chamber and to pack additional lymph nodes to tissue block.

* * * * *